United States Patent
Hoffmann et al.

(10) Patent No.: US 6,940,193 B2
(45) Date of Patent: Sep. 6, 2005

(54) SPINDLE MOTOR WITH AN ELECTRO-CONDUCTIVE CONNECTION BETWEEN THE BEARING SYSTEM AND THE BASEPLATE OR FLANGE

(75) Inventors: Joerg Hoffmann, Mettlach (DE); Thilo Rehm, Villengen-Schwenningen (DE)

(73) Assignee: Minebea Co., Ltd., Nagano (JP)

( * ) Notice: Subject to any disclaimer, the term of this patent is extended or adjusted under 35 U.S.C. 154(b) by 71 days.

(21) Appl. No.: 10/623,202

(22) Filed: Jul. 18, 2003

(65) Prior Publication Data

US 2004/0108780 A1 Jun. 10, 2004

(30) Foreign Application Priority Data

Dec. 4, 2002 (DE) ..................................... 202 18 821 U

(51) Int. Cl.[7] .............................................. H02K 11/00
(52) U.S. Cl. ..................... 310/67 R; 310/68 R; 310/71; 360/99.08; 360/98.07; 360/99.04
(58) Field of Search .......................... 310/89, 91, 67 R, 310/68 R, 90, 71; 360/99.08, 98.07, 99.04

(56) References Cited

U.S. PATENT DOCUMENTS

| | | | | |
|---|---|---|---|---|
| 6,020,664 A | * | 2/2000 | Liu et al. | 310/90 |
| 2002/0089247 A1 | * | 7/2002 | Ibata et al. | 310/81 |
| 2003/0030340 A1 | * | 2/2003 | Tashiro | 310/91 |

* cited by examiner

Primary Examiner—Tran Nguyen
(74) Attorney, Agent, or Firm—Joel Lutzker, Esq.; Anna Vishev, Esq.; Schulte Roth & Zabel LLP

(57) ABSTRACT

Permanent electro-conductive connection is achieved between a bearing component and a baseplate/flange by providing at least one solid-state contact element between the baseplate/flange and the bearing component. The contact element establishes an electric contact between these parts by exercising mechanical force on the baseplate/flange and/or the bearing component. Alternatively, at least one welding seam may be formed between the baseplate/flange and the bearing component to establish the electro-conductive connection.

15 Claims, 8 Drawing Sheets

US 6,940,193 B2

SPINDLE MOTOR WITH AN ELECTRO-CONDUCTIVE CONNECTION BETWEEN THE BEARING SYSTEM AND THE BASEPLATE OR FLANGE

CROSS-REFERENCE TO RELATED APPLICATIONS

This application claims all rights of priority to German Patent Application Serial No. DE 202 18 821.3, filed Dec. 4, 2002 (pending).

FIELD OF INVENTION

The invention relates to a spindle motor, commonly utilized to power hard disk drives, having an electro-conductive connection between the bearing system and the baseplate or flange.

For spindle motors used to power hard disk drives it is necessary that all parts of the motor have the same electrical level to avoid an electrostatic charge and any possible damage that can be caused to the electric components of the hard disk drive. This applies equally to spindle motors with roller bearing systems and to spindle motors with a hydrodynamic bearing arrangement (fluid bearing).

The invention applies in particular to the often critical electric contact between the actual baseplate or the flange of the motor and a component of the bearing system, e.g. the sleeve of a fluid bearing, in direct or indirect electro-conductive connection with the rotor. When the spindle motor is stationary, the shaft or the thrust plate of the bearing has a metal-to-metal contact with the bearing sleeve. Additionally, the shaft has a metal-to-metal contact with the rotor. For various reasons, the bearing sleeve may not have a sufficient electric contact with the baseplate that in specific circumstance's can lead to the problems outlined above.

To insure a proper contact between the bearing sleeve and the baseplate, the bearing sleeve is typically pressed into a recess in the baseplate. The pressing process enables the electric contact between the baseplate and sleeve. However, during the pressing-in process, considerable force has to be applied to the bearing sleeve and there is a risk of damaging the sleeve. To avoid this, the sleeve is initially pressed into the baseplate and only then machined. This process considerably increases the time and cost of machining and assembly of the bearing.

A simpler method is to glue the finished sleeve into the baseplate. Since no external pressure is exerted during this process, the rotor can be fully assembled together with the bearing system and the entire system then glued into the baseplate. To provide strength, a non-conductive adhesive must be used here giving rise to the problem of an interruption in the electric contact between the sleeve and baseplate. For this reason, the electric contact is established by using a conductive adhesive applied locally between the baseplate and sleeve. Use of this adhesive is, however, relatively expensive. Additionally, it has been shown that under specific operating conditions, e.g. due to fluctuations in temperature, increase in air humidity, etc., this electric contact can be interrupted or electric resistance can become unacceptably high. Also, oxidation of the surfaces connected by the conductive adhesive has been observed.

SUMMARY OF THE INVENTION

It is an object of the present invention to permanently improve the electric contact between the bearing system and the baseplate or flange of a spindle motor.

In accordance with the invention, a permanent electro-conductive connection is achieved between a bearing component and a baseplate/flange by providing at least one solid-state contact element which, by exercising mechanical force on the baseplate/flange and/or the bearing component, establishes an electric contact between these parts.

An alternative solution is to provide at least one welding seam between the baseplate/flange and the bearing component to establish the electro-conductive connection.

In one preferred embodiment of the invention, the contact element is preferably accommodated in a recess positioned between the baseplate/flange and the bearing component and can comprise a spherical body, an elastic spring such as a coil spring, a leaf spring or an annular spring, or a wire-shaped pin.

In another preferred embodiment of the invention, the contact element can be pressed into a bore accommodated fully within the baseplate/flange. The bore is positioned such that it directly adjoins the bearing component to be contacted. As the contact element is pressed in, the baseplate expands in the area of the bore and presses against the nearby component forming a permanent electric contact between the parts. The contact element can preferably take the shape of a spherical body or a wire-shaped pin.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENTS AND THE DRAWINGS

Figure 1:
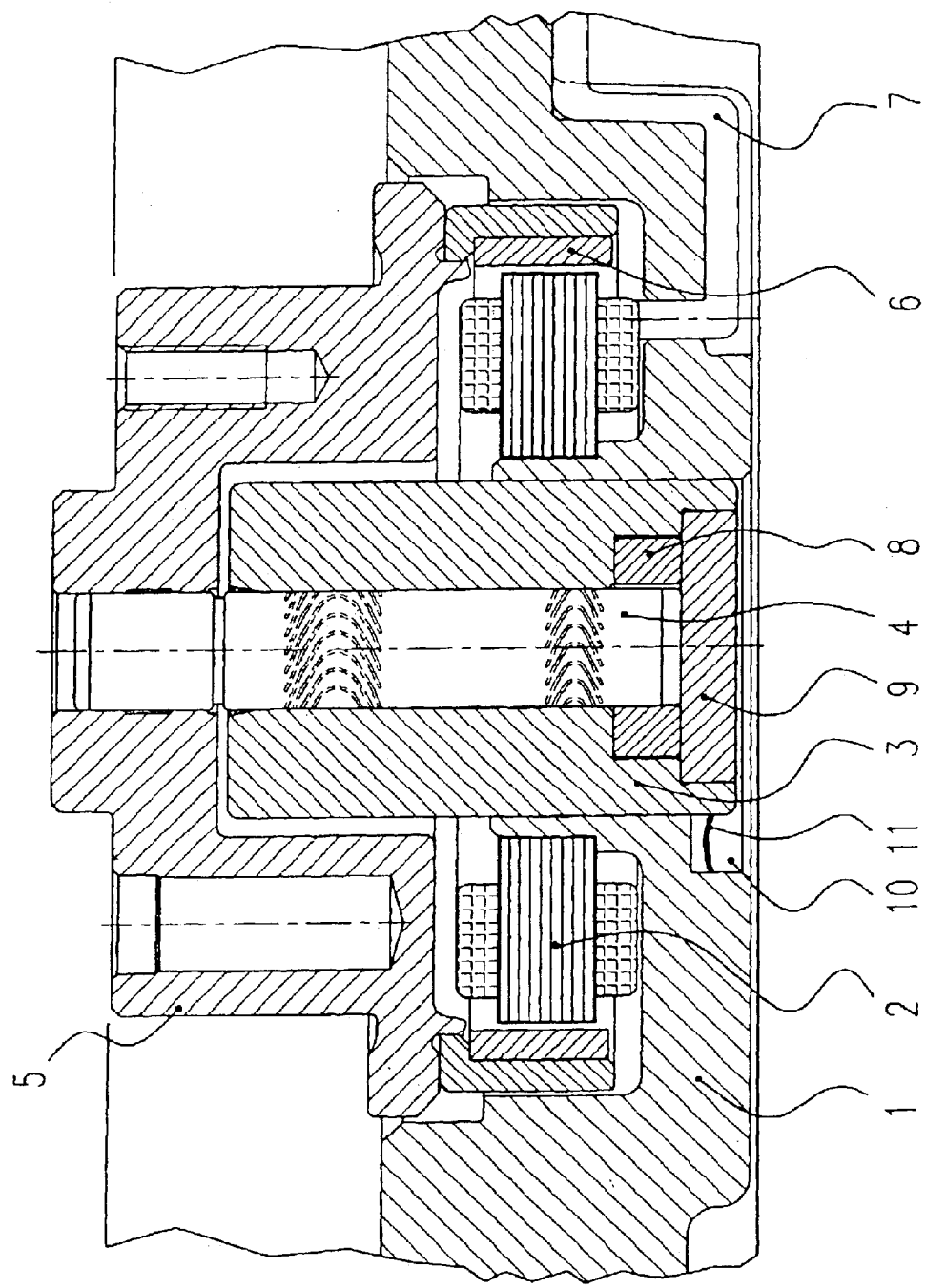
FIG. 1 is a cross-sectional view of the spindle motor according to the invention showing a leaf spring as the contact element.

The spindle motor according to FIG. 1 includes stationary baseplate 1 having stator arrangement 2 placed thereon.

Stator arrangement 2 includes a stator core and coil windings. Bearing sleeve 3 is held in a recess provided in baseplate 1 and has an axial cylindrical bore in which rotatable shaft 4 is accommodated. The free end of the shaft carries rotor cap 5 on which one or several disks (not illustrated) of a hard disk drive are arranged. Annular permanent magnet 6 with several pairs of poles is accommodated on the lower inside edge of rotor cap 5. Annular permanent magnet 6 is influenced by an alternating electric field created by stator arrangement 2 separated by an operational air gap, such that rotor cap 5 together with shaft 4 is made to rotate. Electric current for the stator coils may be supplied, for example, by electric cable 7. Shaft 4 having thrust plate 8 secured thereto and bearing sleeve 3 form a hydrodynamic bearing arrangement whose function is not described in more detail here. The bottom opening of the bearing arrangement is covered by cover plate 9.

In accordance with the invention, baseplate 1 has a local recess 10, preferably provided in its lower section. Local recess 10 is preferably positioned directly adjoining bearing sleeve 3. An electro-conductive contact element in the form of metal leaf spring 11 is provided within recess 10, thus creating an electric contact between baseplate 1 and bearing sleeve 3. Leaf spring 11 ensures that an appropriate force is exerted on the contact surfaces, i.e. the surfaces of contact between baseplate 1 and bearing sleeve 3. Because contact surfaces are relatively small, a high surface pressure and greater contact reliability is achieved using relatively little force.

Leaf spring 11 is preferably triangular or rectangular in shape. Additionally, leaf spring's contact points are preferably sharpened such that they can dig into the material of baseplate 1 and bearing sleeve 3 with great force ensuring permanent contact.

Figure 2:
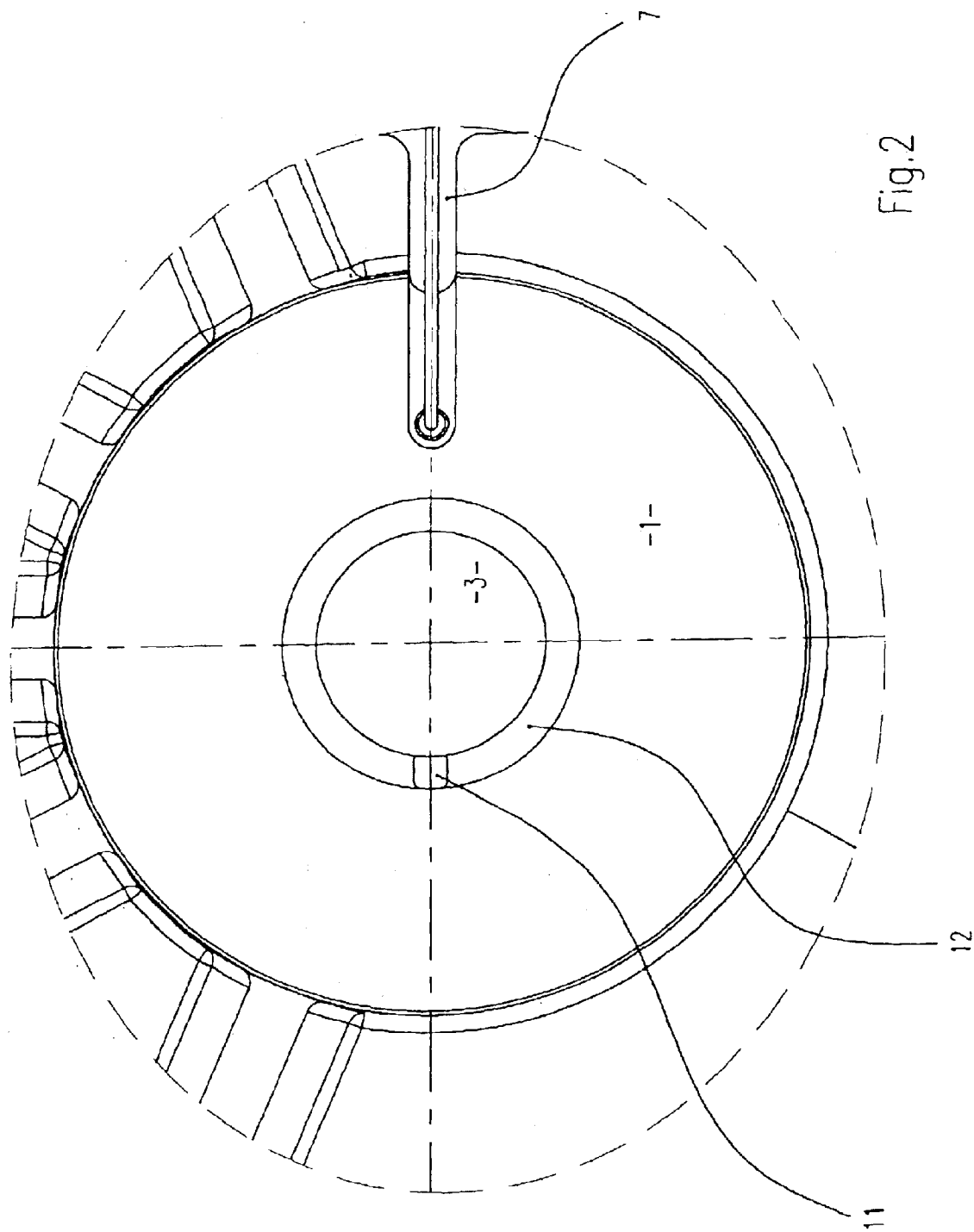
FIG. 2 is a bottom view of a modified spindle motor shown in FIG. 1 showing a ring-shaped recess.

The embodiment of the present invention shown in FIG. 2 provides a modification to the embodiment shown in FIG. 1 in that annular recess 12 is provided to accommodate leaf spring 11. The advantage of having annular recess 12 over local recess 10 is that the annular recess is easier to manufacture.

Figure 3:
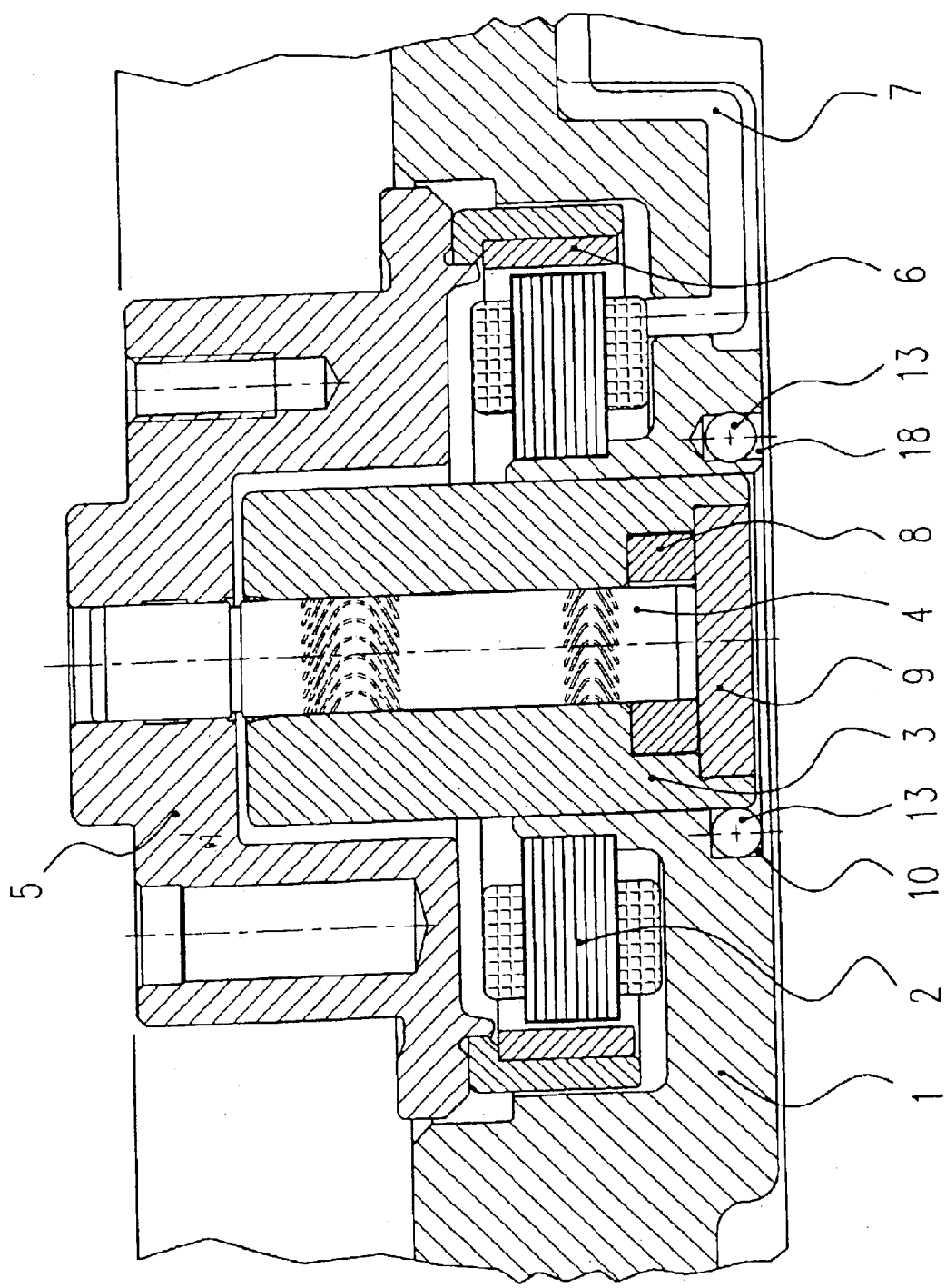
FIG. 3 is a cross-sectional view of the spindle motor according to the invention showing a spherical body as the contact element.

In the embodiment shown in FIG. 3, sphere 13 is used as the contact element between the baseplate and the bearing sleeve, instead of a leaf spring. As can be seen on the left side of FIG. 3, sphere 13 is pressed into local recess 10 in baseplate 1 between the baseplate and bearing sleeve 3. The diameter of the sphere 13 is preferably larger than the largest radial width of local recess 10. When sphere 13 is pressed in, contacting bearing components become distorted, particularly the aluminum baseplate. When the press-in force of sphere 13 is great enough, a gastight connection between the contact surfaces is created. This ensures permanent electric contact between the parts. A bottom view of this embodiment is shown in FIG. 4.

The right side of FIG. 3 shows an embodiment in which sphere 13 is pressed fully into bore 18 provided within baseplate/flange 1. Bore 18 is positioned such that it directly adjoins bearing sleeve 3. As contact sphere 13 is pressed in, the baseplate 1 expands in the area of bore 18 and presses against bearing sleeve 3 creating a permanent electric contact between the parts.

Figure 4:
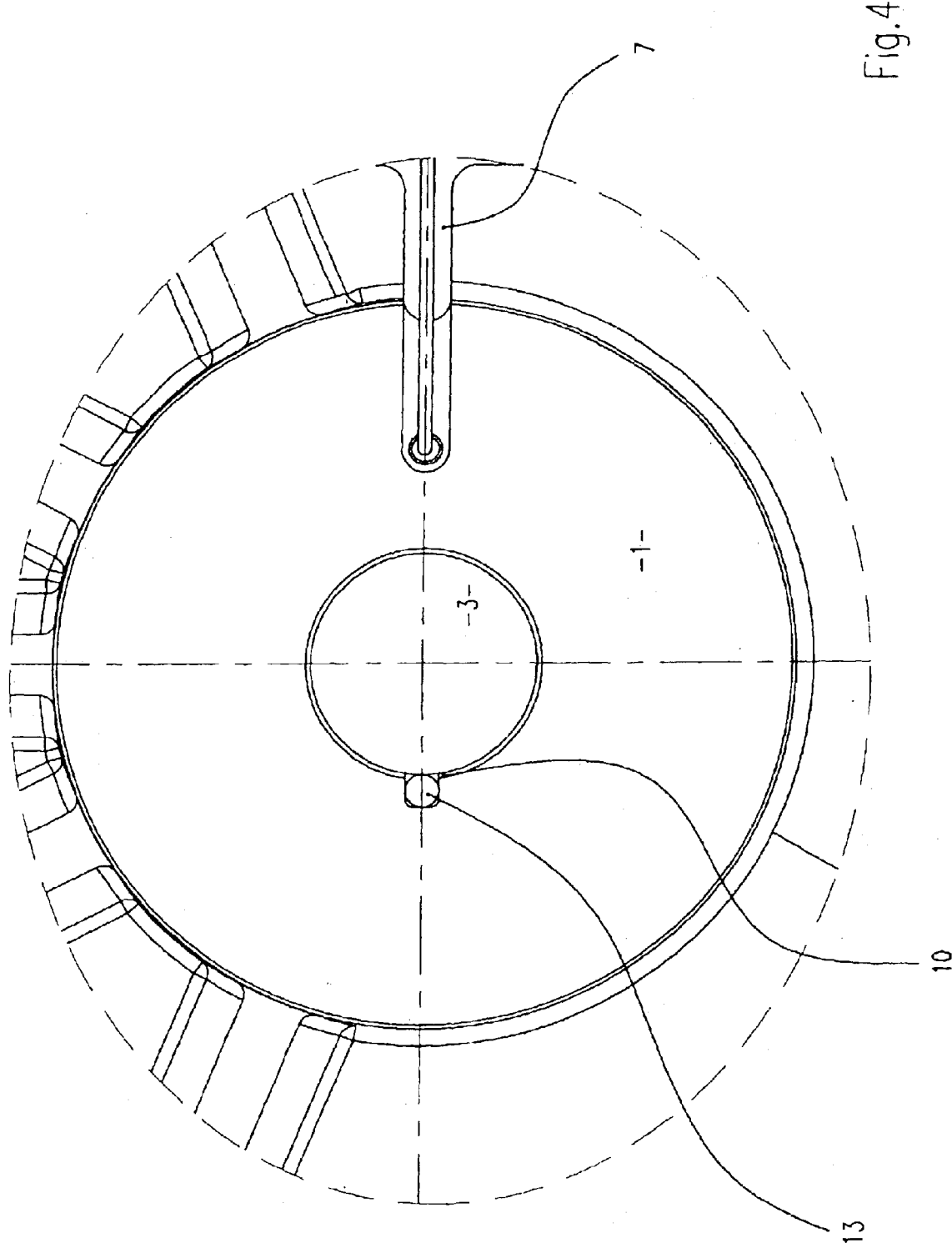
FIG. 4 is a bottom view of the spindle motor shown in FIG. 3.
Figure 5:
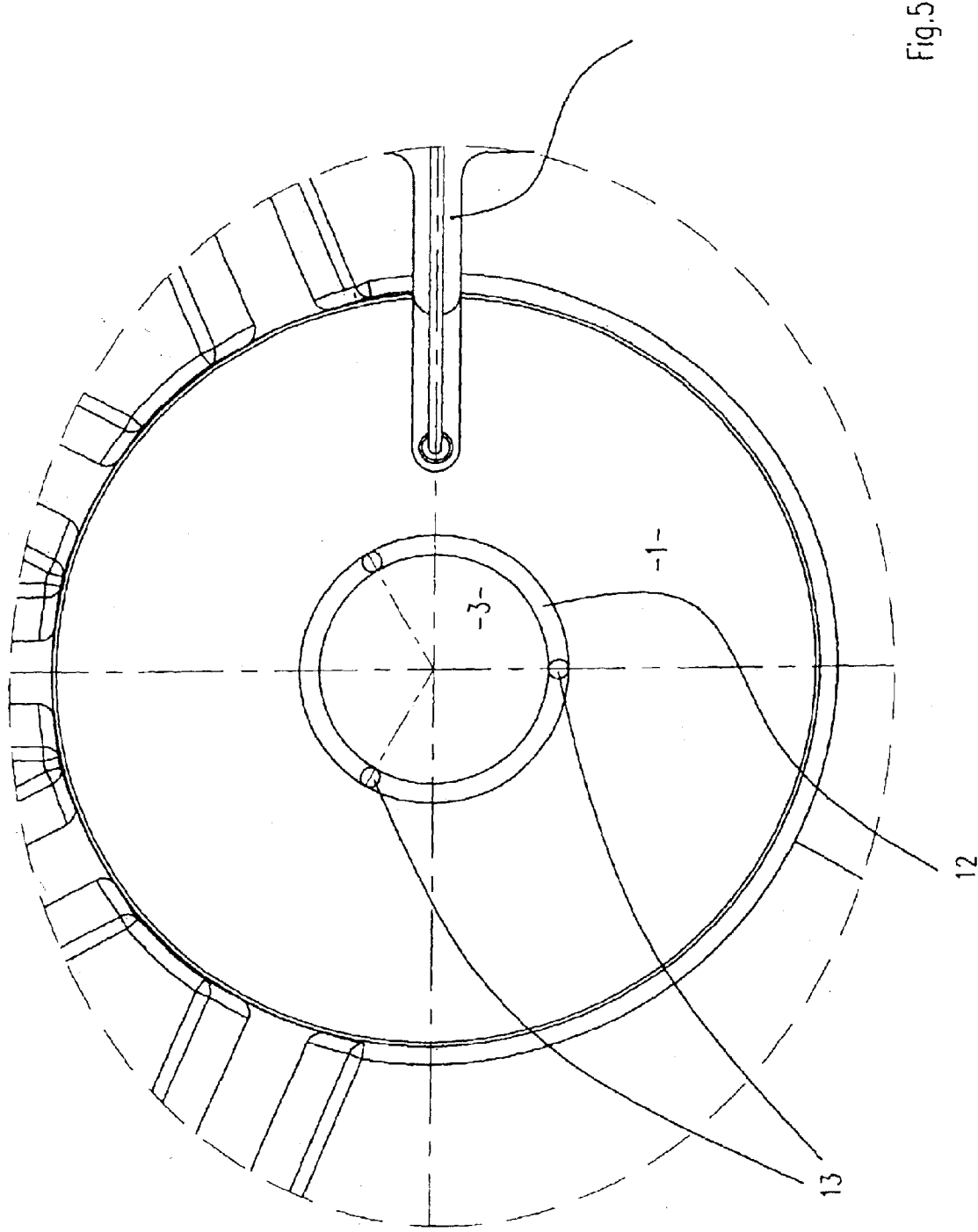
FIG. 5 is a bottom view of a modified spindle motor shown in FIG. 3 showing several spherical bodies as contact elements.

FIG. 5 shows a modification of the embodiment shown in FIGS. 3 and 4. Annular recess 12 is again provided in which several distributed spheres 13 are pressed in. The larger number of contact elements increases contact reliability.

Figure 6:
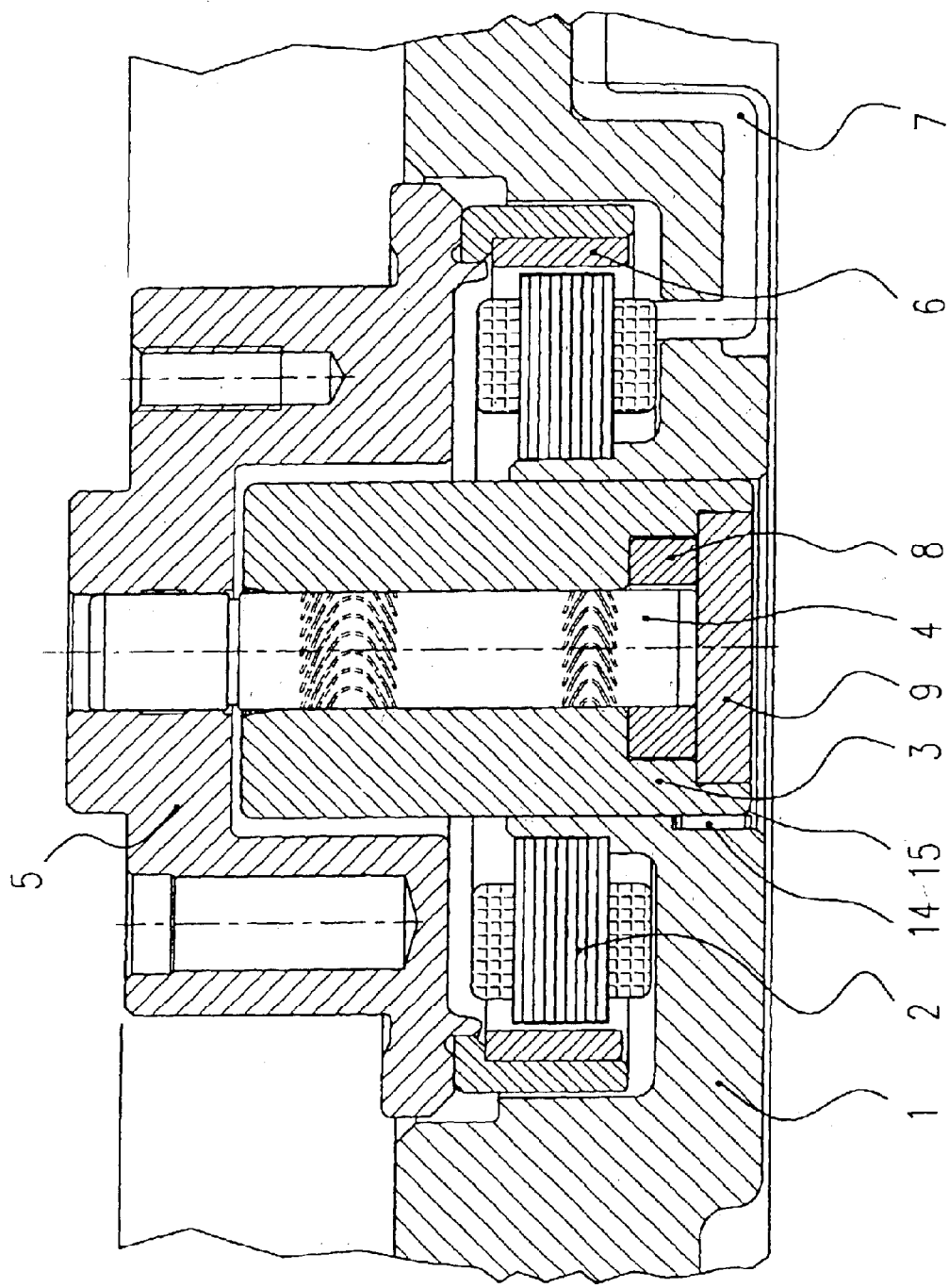
FIG. 6 is a cross-sectional view of the spindle motor according to the invention showing a wire pin as the contact element.

FIG. 6 shows an embodiment which provides for a very small recess 15 serving as a bore in baseplate 1. Contact pin 14 is pressed into recess 15. A contact situation resembling that for the contact sphere is created.

Figure 7:
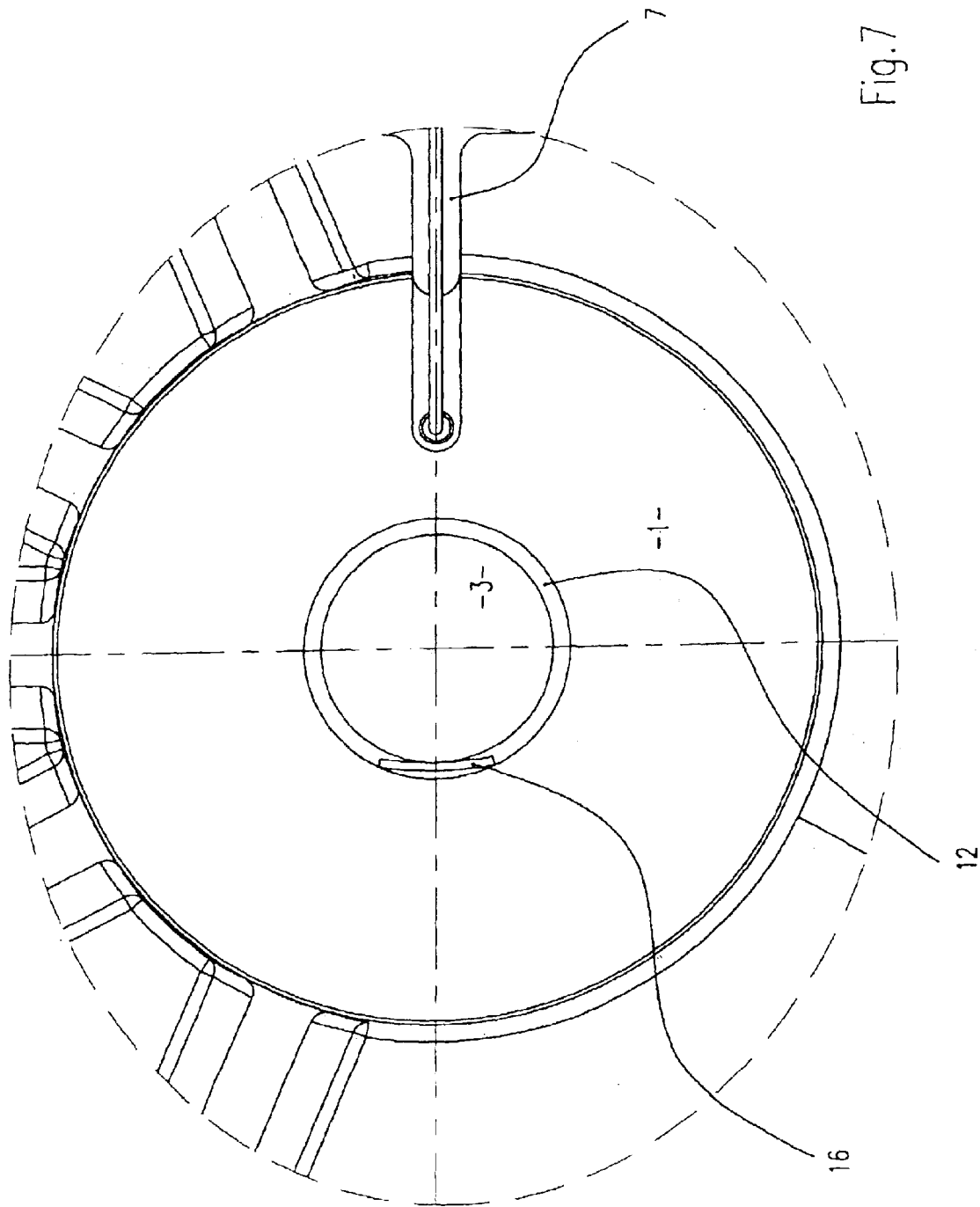
FIG. 7 is a bottom view of a spindle motor having an elongated leaf spring or a spring wire as the contact element.

FIG. 7 shows an embodiment in which an elongated leaf spring 16 or an appropriate spring wire is introduced longitudinally into annular recess 12. The length of the leaf spring 16 is calculated in such a way that under pressure, the leaf spring 16 presses against both baseplate 1 and bearing sleeve 3.

Figure 8:
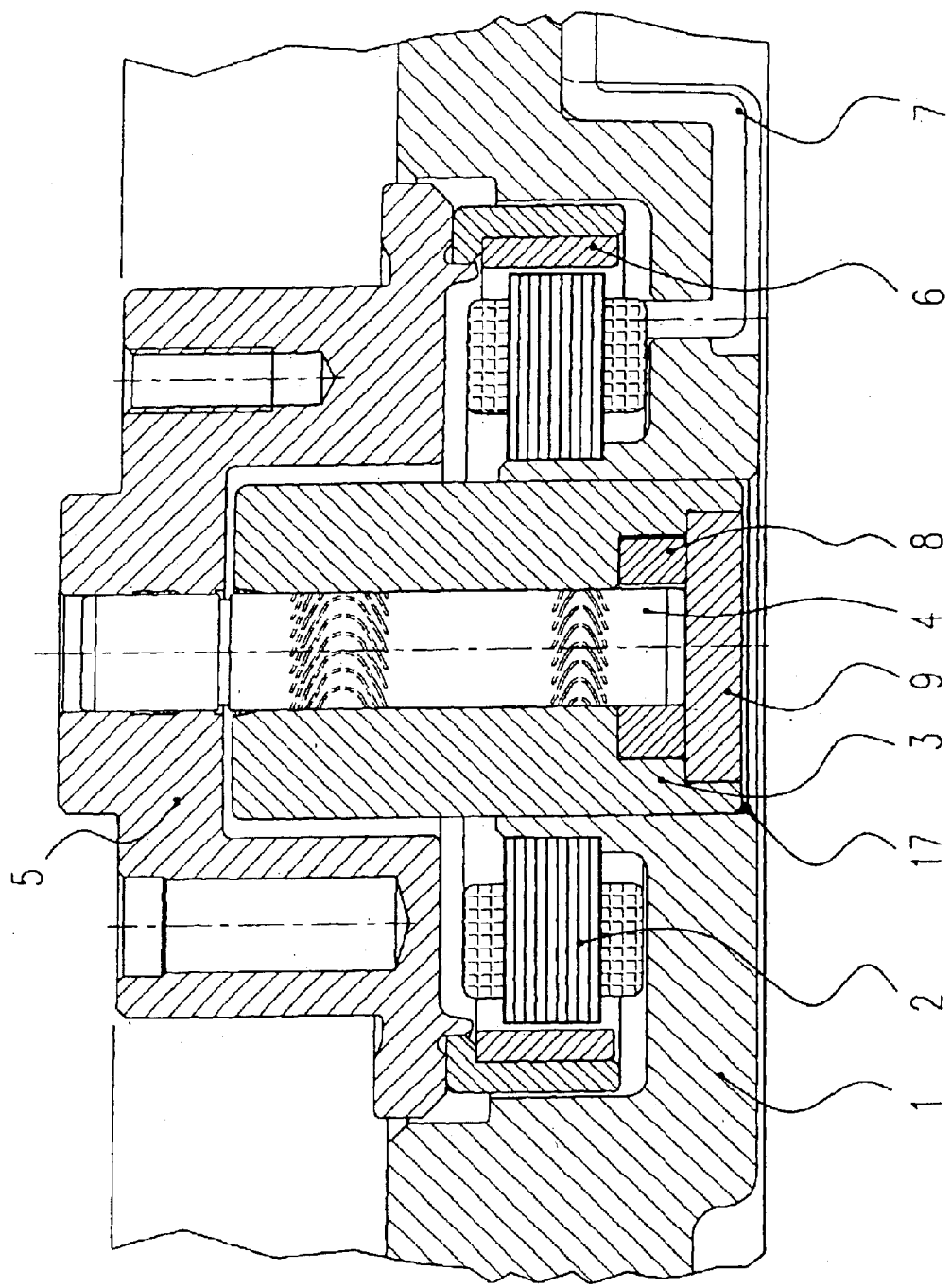
FIG. 8 is a cross-sectional view of the spindle motor according to the invention showing a weld spot provided to establish an electric contact.

According to the embodiment shown in FIG. 8, no recess is provided. Instead, an electric contact is accomplished by at least one welding seam 17 which creates a connection between baseplate 1 and bearing sleeve 3. This welding seam 17 is not subjected to any mechanical force and is only used to create a contact. Several distributed welding seams 17 may also be provided.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A spindle motor comprising:
   a baseplate;
   a rotor;
   a bearing system, said bearing system further comprising at least one component directly or indirectly electrically connected to said rotor;
   a recess located between said baseplate and said bearing component; and
   at least one solid-state contact element,
   wherein a permanent electro-conductive connection is provided between said baseplate and said bearing component of said bearing system through the exertion of mechanical forces by said solid-state contact element on at least one of said baseplate and said bearing component and wherein said solid-state contact element is accommodated in said recess.

2. The spindle motor according to claim 1, wherein said solid-state contact element is positioned between adjoining surfaces of said baseplate and said bearing component.

3. The spindle motor according to claim 1, wherein said solid-state contact element is pressed into said recess.

4. The spindle motor according to claim 1, wherein said solid-state contact element is pressed into said bore.

5. The spindle motor according to claim 1 wherein said solid-state contact element is a spherical body.

6. The spindle motor according to claim 1, wherein said solid-state contact element is a wire-shaped pin.

7. The spindle motor according to claim 1, wherein said solid-state contact element is an elastic spring.

8. The spindle motor according to claim 1, wherein said solid-state contact element is selected from the group consisting of a coil spring, a leaf spring and an annular spring.

9. The spindle motor according to claim 1, wherein said bearing component is a bearing sleeve accommodating said shaft.

10. A spindle motor comprising:

a baseplate;

a rotor;

a bearing system, said bearing system further comprising at least one component directly or indirectly electrically connected to said rotor; and at least one welding seam, wherein said bearing component is a bearing sleeve accommodating said shaft, and wherein a permanent electro-conductive connection is provided between said baseplate and said bearing sleeve of said bearing system through said welding seam.

11. A spindle motor comprising:

a baseplate;

a rotor;

a bearing system, said bearing system further comprising at least one component directly or indirectly electrically connected to said rotor;

a bore formed in said baseplate; and at least one solid-state contact element, wherein a permanent electro-conductive connection is provided between said baseplate and said bearing component of said bearing system through the exertion of mechanical forces by said solid-state contact element on at least one of said baseplate and said bearing component and wherein said solid-state contact element is accommodated entirely within said bore.

12. The spindle motor according to claim 11, wherein said solid-state contact element is a spherical body.

13. The spindle motor according to claim 11, wherein said solid-state contact element is a wire-shaped pin.

14. The spindle motor according to claim 11, wherein said solid-state contact element is an elastic spring.

15. The spindle motor according to claim 11, wherein said solid-state contact element is selected from the group consisting of a coil spring, a leaf spring and an annular spring.

* * * * *